United States Patent Office 2,778,770
Patented Jan. 22, 1957

2,778,770

PROCESS FOR OBTAINING EPINEPHRINE FREE ADRENAL CORTICAL HORMONES

Emil Gilbert Conason, Brooklyn, N. Y., assignor to Schenley Industries, Inc., New York, N. Y., a corporation of Delaware No Drawing. Application April 13, 1954,
Serial No. 422,991

2 Claims. (Cl. 167—77)

This invention relates, generally, to processes for obtaining physiologically active substances by treatment of mammalian adrenal glands which may be used in treatment of diseases in humans due to dysfunctions of endocrine glands, especially the suprarenal glands, and the products thereby obtained.

It is now well known that dysfunctions of the suprarenal, or adrenal, glands resulting in insufficient secretion of the adrenal cortical hormone, can effect profound metabolic disorders in humans and other animals, but that such disorders, in most instances, can be corrected, or at least ameliorated, by administration of extracts derived from mammalian adrenal cortical glands.

The term "adrenal cortical hormone" as herein employed means no single substance or even any single group or type of substances recognized as such in chemistry: instead, it signifies the complex of chemical substances, steroids and other physiologically active materials, excepting the blood pressure-raising principle, epinephrine, elaborated and internally secreted by the mammalian adrenal cortex, which, when introduced into the blood stream of an adrenalectomized but otherwise normal animal, results in life maintenance over a substantial period of time.

In accordance with methods presently employed, the preparation of adrenal cortical extracts suitable for use in replacement or supplemental therapy is beset with many difficulties which make the extracts very costly and their use in amounts adequate for satisfactory clinical results almost prohibitively expensive. One of these difficulties is that only a limited quantity of fresh glands is available from slaughterhouses and other sources because the number of cattle slaughtered is determined by food requirements, not by the need for the animal glands, and to the relatively small physical size of the glands. A further factor of major importance in increasing the cost of the extracts is the small amount of hormone which is present in the glands and the difficulty with which it is obtained therefrom. Unlike the thyroid, for example, which is relatively rich in the content of its hormone, the adrenal cortex, the testis, and certain other endocrine glands apparently liberate their hormones into the circulating blood stream almost as rapidly as the hormones are elaborated in the glandular tissues, thus no substantial store of the hormone accumulates in the glands from which it may be extracted.

Another difficulty encountered in preparing potent adrenal cortical extracts is that, due to the instability of the hormone and its rapid autolytic disintegration in the extirpated glands, it is necessary to provide immediate processing of the fresh glands after the animal is slaughtered if valuable materials are not to be lost.

Broadly stated, the present-day methods for the preparation of adrenal cortical extracts involve a prolonged treatment of ground fresh whole adrenal glands of hogs, cattle or sheep, with a substantially neutral, water-miscible, organic solvent, such as acetone or alcohol, to yield a crude extract containing the physiologically active soluble substances in the glands. By repeated solvent partition procedures applied to this crude extract, the hormone complex is separated from inert materials, such as fatty bodies and connective glandular tissue, and from epinephrine. The final concentrate so obtained then is adjusted to conform to an established standard and to contain an arbitrarily chosen number of biological units per volume unit, or the volume of the extract may be adjusted so that its potency may be expressed in terms of an equivalent weight of whole adrenal glands.

While various methods have been described in the technical literature for the preparation of adrenal cortical extracts, the procedure developed by Kuizenga et al. ("The Chemistry and Physiology of Hormones," page 57, American Association for the Advancement of Science Press, Washington, 1944; also the Kuizenga et al. article in J. Biol. Chem., 147, 561 (1943)), serves well to illustrate a typical, present-day, commercial process for making these extracts. This process yields, from 1000 pounds of fresh beef adrenals, 9 grams of final product containing the biological equivalent of 2.5 grams of 17-hydroxy-11-dehydrocorticosterone (Kendall's Compound E), when assayed by the work performance test of Ingle, or 8 rat units per milligram when assayed by the growth-survival test of Cartland and Kuizenga.

In accordance with the Kuizenga et al. process, 1000 pounds of beef adrenals are ground into 300 gallons of acetone, extracted for 7 days, filtered and the residue, consisting chiefly of gland cellular material, is discarded. The filtrate, comprising about 400 gallons of 80% acetone extract, is treated to remove the acetone, leaving an aqueous solution, which is extracted with petroleum naphtha (Skellysolve B) and this extract is discarded. The remaining aqueous solution is extracted with ethylene dichloride and the aqueous layer, which contains substantially all of the epinephrine, is discarded. The ethylene dichloride solution (30 grams) is partitioned, first with 70% ethanol and petroleum naphtha, then with 30% methanol and petroleum naphtha, and the petroleum naphtha fractions are discarded. The aqueous alcoholic solution (13 grams) is treated to remove the alcohol and the residual aqueous solution is extracted with ethyl acetate and the separated aqueous layer is discarded. The ethyl acetate extract is washed, successively, with 1% aqueous sodium carbonate solution and with 0.5 N aqueous hydrochloric acid to remove acidic and basic materials, respectively, yielding, as above mentioned, merely 9 grams of concentrated hormone extract, having a potency of 75,000 rat units, when assayed by the growth-survival test of Cartland and Kuizenga, which is biologically equivalent to 2.5 grams of Kendall's Compound E.

To a technically informed critic, disadvantages of the Kuizenga et al. process are self-evident: The process requires a long period of time to complete the handling of each batch and, during this period, appreciable autolytic destruction of active material may occur unless the glands are preserved with solid $CO_2$ or the like until processed; large quantities of expensive, volatile, highly combustible organic solvents are required and the use of these solvents presents the hazards of fire and explosion with attendant danger to property and personnel; and it is necessary that provision be made for solvent recovery and purification.

Moreover, the initial treatment of the whole fresh glands itself does not fully deplete the physiologically active material present in the glands but, instead, appreciable quantities of active material may remain in the residual mass of connective tissue and thus are discarded; and each partitioning solvent removes merely a portion of the active material, not all of it, thus some of the active material inevitably is lost.

Another disadvantage of the Kuizenga et al. process is the need for maintaining low temperatures throughout the operations, including those steps wherein solvent removal is effected, which requires the use of high vacuum distillation apparatus and other specialized types of equipment which are bulky, require a large capital investment and are expensive to operate and maintain.

In accordance with the present invention, there is provided an improved process for obtaining physiologically active, epinephrine-free, hormone substances from mammalian adrenal glands having the advantages over the Kuizenga et al. process of (1) substantially eliminating the use of organic solvents to effect removal of the hormone from the animal gland source, of (2) effecting a more complete removal of the hormone than is achieved by the Kuizenga et al. process, of (3) requiring merely a relatively short period of time for effecting substantially full recovery of the material from its animal gland source and of (4) yielding a product having a high physiological potency and a balance of its steroid components different from that of the Kuizenga et al. product.

The process of this invention comprises as an essential step, the proteolysis of the animal glands, whereby, in effect, proteinaceous materials constituting the gland tissue are dissolved or disintegrated, thereby liberating the desired physiologically active hormones into aqueous solution, from which inactive materials may be readily separated and the active substances may be recovered by simple and direct procedures. During at least part of the proteolysis, an epinephrine-antagonistic agent is introduced into or is present in the digestion mixture whereby the product obtained is made substantially free of epinephrine.

By the term "epinephrine-antagonistic agent" as herein employed is meant an entity capable of removing or destroying Adrenalin and noradrenalin or of rendering it innocuous. Among the entities that may be used for this purpose are oxidizing agents, such as atmospheric oxygen, iodine and ferric salts; and formaldehyde. It will be understood that the selection of the epinephrine-antagonistic agent is in part controlled by the selection of the agent for effecting proteolysis for, in some instances, the epinephrine-antagonistic agent may react with or inactivate the agent for effecting proteolysis as will be hereinafter discussed in detail.

Among the agents for effecting proteolysis that may be used in the practice of the improved process according to this invention are the proteolytic enzymes papain, pepsin, trypsin, ficin, bromelin and the bacterial proteases. Of these enzymes, papain presently is preferred above the other enzymes mentioned because it has been found that it not only destroys the cells and connective tissues of the glands but, additionally, perhaps because of the lipase activity present in papain, it so modifies lipins and other material present that an easy separation of physiologically active material from inactive materials can be effected.

According to the preferred embodiment of the process of this invention, adrenal glands are ground, or otherwise subdivided, and treated, in the presence of an epinephrine-antagonistic agent, which may be present when the proteolysis is initiated or may be introduced into the digestion mixture subsequently, with an aqueous solution of papain, at a hydrogen ion concentration within the range of pH 3.5 to pH 7 and preferably about pH 5.2, at a temperature within the range of about 45° to 55° C., for a period of at least one-half hour until the mixture is superficially uniform in appearance. The aqueous phase is separated from residual solids by any desired conventional method, for instance, by decantation, filtration or centrifugation.

The aqueous phase is concentrated by evaporation in vacuo to a 50% solids content; then it is treated with acetone to cause precipitation of a substantial proportion of the undesired materials present. After the acetone has been removed, the solution is further processed by an ethylenedichloride extraction. The solvent is then removed and the resulting product is dissolved in 10% ethanol.

When the process of this invention is practiced using enzymes other than papain, minor modifications of the above-described operations are desirable. For instance, if pepsin is used, the hydrogen ion concentration of the mixture may be maintained within the range of pH 1.0 to 2.5, whereas, if trypsin is used, the hydrogen ion concentration may be maintained within the range of pH 7.5 to pH 8.5, and the period required to effect the desired degree of proteolysis of the glandular tissue by use of either of these enzymes is somewhat longer than is necessary when using papain.

When the proteolysis is effected by use of papain in the process of this invention, papain activation occurs normally, without addition of a reducing agent, because of the presence in the brie of reducing substances such as ascorbic acid. If desired, of course, the papain may be activated by addition to the mixture of a suitable reducing agent, such as ammonium thioglycollate.

To facilitate a better understanding of the process of this invention, specific examples follow which, it will be understood, are provided by way of illustration merely and are not to be construed as imposing limitations upon the scope of the invention.

*Example 1*

One (1) kilogram of frozen fresh hog or beef glands is reduced to a brie by comminution with and the addition of distilled water, and the hydrogen ion concentration of the brie is determined. Normally, the hydrogen ion concentration of the brie is about pH 5.2, if the glands used are fresh, but if the hydrogen ion concentration materially differs from pH 5.2, it is adjusted to approximately within the range of pH 4.5 to pH 5.5. After the hydrogen ion concentration of the brie has been determined, and adjusted if necessary, 3 grams of papain, to which an equal weight of ammonium thioglycollate has been added as a papain activator, are added to the brie and the temperature of the mixture is maintained within the range of 45° to 55° C. for a period of at least a half hour. Operations at temperatures below 45° C. proceed too slowly and at temperatures above about 55° C., enzyme degradation occurs. The mixture is treated with formaldehyde as an epinephrine-antagonistic agent, using a quantity sufficient to destroy any Adrenalin or noradrenalin that is present, then the mixture is filtered to remove the insoluble mucinous residue, and the aqueous fraction is separated from the lipid fraction. The lipid fraction and residue are discarded. From this aqueous fraction, an aqueous extract of the physiologically active hormone principles of the mammalian adrenal cortex is obtained as will be described hereinafter in detail. This extract may be used in replacement therapy for treatment of adrenal dysfunctions.

*Example 2*

The process described in Example 1 is repeated except that the papain and its activator are replaced by about an equivalent weight of trypsin, and the hydrogen ion concentration of the brie, during digestion, is maintained within the range of pH 7.5 to pH 8.5. The time required for digestion is substantially the same as that required when papain is used as described in Example 1. The aqueous solution obtained in this manner may be used for the same purposes as the product obtained by the process described in Example 1.

*Example 3*

The process described in Example 1 is repeated excepting that the papain and its activator are replaced by an equivalent weight of pepsin and the hydrogen ion concentration of the mixture is maintained within the range of pH 1.0 to pH 2.5. The aqueous solution thus obtained may be used for the same purposes as the product obtained as described in Example 1.

Example 4

About 7.69 kilograms of beef adrenal glands, quick-frozen when removed from the animal carcass, are passed through a grinder, placed in a 10 liter vessel and 23.9 grams of papain, dissolved in 1 liter of warm water, is added, with an additional liter of warm water to facilitate mixing. The mixture is agitated and its temperature is increased to approximately 50° C.±5° C. and maintained at this temperature for a total period of about one hour, measured from the time of addition of the papain to the glands. Formalin (3% HCHO) is then added to the mixture to inactivate Adrenalin and noradrenalin present, about 100 milliliters being adequate for this purpose.

After mixing has been completed, the mixture stratifies and the layers are separated as described in Example 1.

The aqueous fraction so obtained may be used for the same purposes as that obtained as described in Example 1.

Example 5

About 17.15 kilograms of deep frozen beef adrenals are partially thawed at room temperature for twenty minutes, then passed through a grinder, and 17 liters of tap water is added. The brie so obtained is stirred until it is superficially uniform in appearance, then about 500 milliliters of glacial acetic acid, saturated with iodine, is added slowly while stirring. The hydrogen ion concentration of the mixture is about pH 4.2 to 4.5. The temperature of the mixture, initially about 15° to 20° C., is increased to about 40° C. on a water-bath within a period of 5 to 10 minutes, then approximately 51 grams of papain, suspended in 200 milliliters of water, is added and stirring is continued for half an hour after the addition of the papain, the temperature being raised to 45° C. At the end of this digestion period, the material is centrifuged and the pale yellow supernatant liquid material is decanted from the grayish proteinaceous residue. This digestion thus carried out rapidly in only a half hour at 45° C. avoids extensive digestion, which would increase the solid content of the aqueous phase, while being sufficient to completely disrupt the cellular organization and effect dissolution of stringy, slimy material. The supernatant liquid, which comprises lipid material as a distinct phase, is filtered, and the lipid material remains behind. The aqueous portion, which is water-clear with a yellowish amber color has a volume of about 20 liters. It is evaporated in vacuo on a water bath maintained at a temperature of about 40° to 45° C. (the temperature of the solution varies between 27° and 30° C.) until this solution is reduced to one-ninth its original volume, then the distillation is stopped and the thick aqueous solution so obtained is treated with 2 volumes of acetone, with stirring, whereupon a voluminous thick sticky pricipitate develops. After stirring for several hours, the supernatant aqueous acetone is decanted, 2 liters of fresh acetone is added and mixing is continued for several more hours. This washing is repeated a third time with one liter of acetone and after stirring it is noted that the acetone is almost free of yellow color. The pooled acetone is filtered from a white precipitate which developed on standing in the cold and the clear yellow aqueous acetone solution is evaporated in vacuo until the aqueous residue is substantially free of acetone and its volume is reduced to about 700 milliliters. The hydrogen ion concentration of this solution, which is about pH 3.5, is adjusted to about pH 6.5 by adding 62 grams of sodium hydroxide (in a 2N solution) slowly, with mixing, and, after pH 6.5 is reached, the aqueous solution is extracted with 3 volumes, in total, of ethylene dichloride, one volume at a time. The ethylene dichloride solution is cooled to −15° C. and filtered free of ice, then it is evaporated to dryness in vacuo. The residue is dissolved in 45 milliliters of ethyl alcohol, then this solution is diluted with 405 milliliters of water to yield 450 milliliters of a final 10% alcohol solution having an activity equivalent to about 38 grams of adrenal tissue per milliliter. It will be noted, when preparing this final extract, after the residue is dissolved in alcohol, the addition of water causes the solution to become opalescent. This opalescence can be reduced by a single extraction with petroleum ether from a 70% alcoholic solution of the extract. When this is done, the aqueous alcoholic solution is separated from the petroleum ether, evaporated to free the water of any alcohol, sufficient alcohol is added for the final stock extract concentration of 10%, and then sufficient water is added to increase the volume so that 1 cubic centimeter of the final product equals 40 grams of tissue. The opalescence above mentioned can be removed completely by use of a physiological saline solution instead of the water used in diluting the ethyl alcohol solution of the residue.

Example 6

The procedure described in Example 5 is repeated using 19.4 kilos of glands, 19 liters of water, 57.7 grams of papain, which is processed similarly to that in said example except that the digestion is carried out at 50° C. and, after digestion for one hour, 600 milliliters of glacial acetic acid saturated with iodine is added, and stirring is continued until dispersion of mucinous material occurs. In this instance, 74 grams of sodium hydroxide is necessary to neutralize the aqueous extract to a hydrogen ion concentration of about pH 6.3. The final dilution, in this instance, also, may be such that 1 cubic centimeter of extract is equivalent to 40 grams of tissue.

Example 7

About 400 grams of gland tissue is suspended in 400 milliliters of water with stirring and 4½ milliliters of concentrated hydrochloric acid is added. The temperature of the mixture is raised to 50° C., at which time 1.4 grams of papain, suspended in 25 milliliters of water, is added and the digestion is allowed to continue for ½ hour. Five (5) milliliters of formalin (37%) is added and stirring is continued for five minutes. The digestion mixture is subsequently further processed in a manner analogous to that described in Example 6.

Example 8

About 4.29 kilos of glands are ground and suspended in 4 liters of water, then enough hydrochloric acid is added to bring the hydrogen ion concentration to pH 4 and digestion is completed in a manner analogous to that of Example 7.

Example 9

About 4.35 kilos of glands is ground and suspended in 4 liters of water and sufficient sulfuric acid is added to bring the hydrogen ion concentration to pH 4.0. About 14 grams of papain is added, the brie is heated to a temperature of 40° C. and the digestion is carried out for half an hour at a temperature of 50° C. The digestion is completed in a manner analogous to that of Example 7.

Example 10

About 400 grams of adrenal tissue is ground and suspended in 400 milliliters of water, and sufficient hydrochloric acid is added, with stirring, until the hydrogen ion concentration of the mixture is about pH 1.5. The temperature of the mixture is raised to 50° C., at which time 1.4 grams of pepsin, suspended in 25 milliliters of water, is added and the digestion is allowed to continue for ½ hour. Further processing of the digestion mixture is completed in a manner analogous to that of Example 7.

Example 11

About 400 grams of adrenal tissue is ground and suspended in 400 milliliters of water, and 1 milliliter of concentrated ammonia is added, changing the hydrogen ion concentration from an initial pH 6.1 to pH 6.8. The temperature of the mixture is raised to 50° C., at which time 1.4 grams of trypsin, suspended in 25 milliliters of water, is added to the brie and the digestion is allowed to continue for ½ hour, then sufficient acetic acid is added to bring the hydrogen ion concentration to about pH 4.0. The appearance of the digestion mixture is similar to that described in Example 7 and it is further processed in a manner analogous to that there described.

The products obtained as above described, when tested by the standard method for assaying epinephrine (dog blood pressure determination method), are found to be epinephrine-free. The steroid content may be assayed by the growth-survival method of Cartland-Kuizenga. The initial gross toxicity of the products may be assayed by a cardial injection of 1 cubic centimeter of a product extract using a two month old Wistar rat as the test animal. It is found that the animal survives, thus indicating absence of toxicity in the products.

The growth-survival assay of Cartland and Kuizenga may be described briefly as follows:

Month old Wistar rats are adrenalectomized under ether anesthesia and confined five rats to a cage. The material to be assayed is injected subcutaneously daily for 20 days. They are fed ad lib on Purina fox chow and tap water and their weights are observed twice weekly. The extract, obtained as above described, when injected daily at a dosage level of five-tenths of a cubic centimeter, sufficed to keep at least 80% of the animals alive for 20 days, with a gain in weight of at least 20 grams for each of the surviving animals.

The products obtained by the processes described in the foregoing examples and pursuant to this invention have a growth-survival activity at least 40% superior to that of commercially available extracts obtained by the Kuizenga et al. process. Furthermore, these new products have a sodium-retention activity at least 25% greater than such commercially available products, when assayed by the method of Kagawa et al. (Proc. Soc. Exp. Biol. Med., 80, 281–5 (1952)).

Having thus described the subject-matter of this invention, what it is desired to secure by Letters Patent is:

1. Process for obtaining epinephrine-free adrenal cortical hormones that comprises subjecting adrenal glands to proteolysis by digesting the glands in an aqueous medium at a hydrogen ion concentration of about pH 5.2 in the presence of a proteolytic enzyme, at a temperature of about 50° C., to liberate the desired physiologically active hormones of the glands from proteinaceous tissue materials, said proteolysis being effected in the presence of an epinephrine-antagonistic agent, separating the resulting aqueous phase, concentrating it by vacuum evaporation, precipitating solids, extracting the aqueous phase with a solvent to obtain the desired physiologically active epinephrine-free adrenal cortical hormones, and removing the solvent.

2. Process for obtaining epinephrine-free adrenal cortical hormones that comprises subjecting adrenal glands to proteolysis by digesting the glands in an aqueous medium at a hydrogen ion concentration of about pH 5.2 in the presence of papain, at a temperature of about 50° C., to liberate the desired physiologically active hormones of the glands from proteinaceous tissue materials, said proteolysis being effected in the presence of an epinephrine-antagonistic agent, separating the resulting aqueous phase, concentrating it by vacuum evaporation, precipitating solids, extracting the aqueous phase with a solvent to obtain the desired physiologically active epinephrine-free adrenal cortical hormones, and removing the solvent.

References Cited in the file of this patent

UNITED STATES PATENTS

| Number | Name | Date |
|---|---|---|
| 1,968,156 | Lautenschlager et al. | July 31, 1934 |
| 2,228,561 | Detzel | Jan. 14, 1941 |
| 2,587,924 | Taylor | Mar. 4, 1952 |
| 2,623,001 | Sylven et al. | Dec. 23, 1952 |